United States Patent
Sanders et al.

(10) Patent No.: US 7,630,734 B2
(45) Date of Patent: Dec. 8, 2009

(54) MOBILE WIRELESS COMMUNICATIONS DEVICE PROVIDING ENHANCED FILE MANAGEMENT AND RELATED METHODS

(75) Inventors: Mark Sanders, Rochester, NY (US); Scott Zeller, Shortsville, NY (US); Nicholas Stocks, Henrietta, NY (US); Mark Benoit, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 474 days.

(21) Appl. No.: 11/254,332

(22) Filed: Oct. 20, 2005

(65) Prior Publication Data

US 2007/0093214 A1   Apr. 26, 2007

(51) Int. Cl.
*H04M 1/00*   (2006.01)

(52) U.S. Cl. .................... 455/552.1; 455/418; 455/419; 455/550.1; 455/551; 455/90.1; 455/90.2; 455/93; 380/255

(58) Field of Classification Search ................ 455/418, 455/419, 550.1, 551, 552.1, 90.1, 90.2, 93, 455/186.1; 380/255
See application file for complete search history.

(56) References Cited

U.S. PATENT DOCUMENTS

| | | | | |
|---|---|---|---|---|
| 5,836,013 A * | 11/1998 | Greene et al. | ................ | 713/2 |
| 5,943,692 A | 8/1999 | Marberg et al. | ............. | 711/203 |
| 6,108,727 A | 8/2000 | Boals et al. | .................... | 710/68 |
| 6,530,065 B1 | 3/2003 | McDonald et al. | ............. | 716/4 |
| 6,539,422 B1 | 3/2003 | Hunt et al. | .................. | 709/217 |
| 6,694,393 B1 * | 2/2004 | Sutter, Jr. | ...................... | 710/68 |
| 6,865,387 B2 * | 3/2005 | Bucknell et al. | ............. | 455/418 |
| 7,092,733 B2 * | 8/2006 | Mukai et al. | ............. | 455/552.1 |
| 7,139,551 B2 * | 11/2006 | Jamadagni | ................ | 455/412.1 |
| 7,283,838 B2 * | 10/2007 | Lu | ........................... | 455/550.1 |
| 7,346,330 B2 * | 3/2008 | Kawabe et al. | ............ | 455/343.4 |
| 2003/0182414 A1 | 9/2003 | O'Neill | ...................... | 709/223 |
| 2005/0108382 A1 | 5/2005 | Murotake et al. | ............ | 709/223 |
| 2006/0015674 A1 * | 1/2006 | Murotake | ................... | 711/101 |

OTHER PUBLICATIONS

*Software Communications Architecture (SCA)*, Technical Overview, available at www.jtrs.army.mil/sections/technicalinformation/technical_SCA.html.
*Software Defined Radios*, Technical Overview, available at www.jtrs.army.mil/sections/technicalinformation/technical_SDR.html.
Software Communications Architecture Specification, JRTS-5000, SCA V3.0, Joint-Tactical Radio System (JRTS) Joint Program Office, Aug. 27, 2004.

* cited by examiner

*Primary Examiner*—Lana N Le
*Assistant Examiner*—Ping Y Hsieh
(74) *Attorney, Agent, or Firm*—Allen, Dyer, Doppelt, Milbrath & Gilchrist, P.A.

(57) ABSTRACT

A mobile wireless communications device is switchable between a plurality of wireless communications operating modes and may include an antenna, a wireless transceiver connected to the antenna, a first memory for storing a respective compressed file for each of the plurality of wireless communications operating modes, and a second memory having a faster access speed than the first memory. The device may further include a processor connected to the wireless transceiver, the first memory, and the second memory for copying the compressed files from the first memory to the second memory, uncompressing a selected one of the compressed files to generate and store a selected compressed file in the second memory, and processing the selected uncompressed file from the second memory and controlling the wireless transceiver based thereon.

21 Claims, 4 Drawing Sheets

MOBILE WIRELESS COMMUNICATIONS DEVICE PROVIDING ENHANCED FILE MANAGEMENT AND RELATED METHODS

FIELD OF THE INVENTION

The present invention relates to the field of communications systems, and, more particularly, to software file management and processing in wireless communications devices and related methods.

BACKGROUND OF THE INVENTION

With advances in processing capabilities and programming technologies, software defined mobile wireless communications devices (e.g., radios) continue to increase in popularity. Rather than relying upon hardware and circuitry components to perform frequency, modulation, bandwidth, security, and/or waveform functions, these functions are instead performed by software modules or components in a software radio. That is, with a software radio analog signals are converted into the digital domain where the above-noted functions are performed using digital signal processing based upon software modules.

Because most of the functions of the radio are controlled by software, software radios may typically be implemented with relatively standard processor and hardware components. This may not only reduce device hardware costs, but it also provides greater flexibility in upgrading the device since new communications waveform modules can be uploaded to the device relatively easily and without the need to interchange new hardware components.

One particular class of software radios which takes advantage of the above-described advantages is the Joint Tactical Radio (JTR). The JTR includes relatively standard radio and processing hardware along with the appropriate waveform software modules for the communication waveforms the radio will utilize. JTRs also utilize operating system software that conforms with the Software Communications Architecture (SCA). The SCA is an open architecture framework that specifies how hardware and software components are to interoperate so that different manufacturers and developers can readily integrate their respective components into a single device.

Still another class of mobile wireless communications devices that increasingly use software components for communicating via different waveforms or standards is cellular communication devices. That is, many cellular devices are now designed to operate with more than one of the numerous cellular standards that are used throughout the world, such as the Global System for Mobile Communications (GSM) and Personal Communications Services (PCS), for example.

Despite the numerous advantages of software radios, one challenge presented by such devices is that the various software modules used for different waveforms can be relatively large. While non-volatile memories such as flash memories allow relatively large amounts of data to be stored in mobile devices, such data needs to be executed from random access memory (RAM), which is more expensive and, therefore, of limited availability on most devices. Yet, many radios are required to switch between waveforms relatively quickly, and the delay time associated with reading and writing waveform modules out of the flash memory and into RAM may be problematic in this regard.

Various approaches have been developed in the prior art to streamline data transfer operations. One example is disclosed in U.S. Pat. No. 6,694,393 to Sutter, Jr. This patent is directed to method for compressing information for use in an embedded system. A program file or other type of information file is partially compressed in a host device and subsequently transferred to a non-volatile memory of the embedded system. The uncompressed portion of the file includes relocation data such as section headers or a file header which identify one or more destination locations for corresponding parts of the file in a random access memory of the embedded system. A loading program running on the embedded system determines a destination location for the file within the embedded system without decompressing the compressed portion of the file. The method is intended to reduce the need for multiple file copy operations in transferring data between the non-volatile memory and RAM in the embedded system.

Despite the benefits of such approaches, further improvements and functionality may be desirable for managing file transfer and processing operations in mobile wireless communications devices.

SUMMARY OF THE INVENTION

In view of the foregoing background, it is therefore an object of the present invention to provide a mobile wireless communications device with desired switching times between processing of different software files and related methods.

This and other objects, features, and advantages in accordance with the present invention are provided by a mobile wireless communications device that is switchable between a plurality of wireless communications operating modes. The device may include an antenna, a wireless transceiver connected to the antenna, a first memory for storing a respective compressed file for each of the plurality of wireless communications operating modes, and a second memory having a faster access speed than the first memory. The device may further include a processor connected to the wireless transceiver, the first memory, and the second memory for copying the compressed files from the first memory to the second memory, uncompressing a selected one of the compressed files to generate and store a selected uncompressed file in the second memory, and processing the selected uncompressed file from the second memory and controlling the wireless transceiver based thereon.

The processor may operate in accordance with a Software Communications Architecture (SCA). Also, the selected compressed file may remain in the second memory after uncompressing by the processor, and the processor may copy the plurality of compressed files from the first memory to the second memory upon startup. Additionally, the processor may further delete the selected uncompressed file from the second memory based upon a selection of a next wireless communications operating mode, and uncompress the compressed file for the next wireless communications operating mode.

By way of example, the first memory may be a non-volatile memory, such as a NAND flash memory. The second memory may be a volatile memory, such as a Random Access Memory (RAM), for example. Also, the compressed files may be compressed waveform files, for example. In addition, the compressed files may be compressed with a Lempel-Ziv-Oberhumer (LZO) data compression algorithm, for example. The mobile wireless communications device may further include a housing carrying the antenna, the wireless transceiver, the first memory, the second memory, and the processor.

The first memory may also be for storing a plurality of compressed cryptogrpahic files. As such, the processor may further copy the compressed cryptographic files from the first memory to the second memory, uncompress a selected one of the compressed cryptographic files in the second memory, and process the selected uncompressed cryptographic file from the second memory.

A method aspect of the invention for wirelessly communicating based upon a plurality of wireless communications operating modes may include storing a respective compressed file for each of the plurality of wireless communications operating modes in a first memory, and copying the compressed files from the first memory to a second memory having a faster access speed than the first memory. The method may further include uncompressing a selected one of the compressed files in the second memory, and processing the selected uncompressed file from the second memory and controlling a wireless transceiver based thereon.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements or steps in alternate embodiments.

Figure 1:
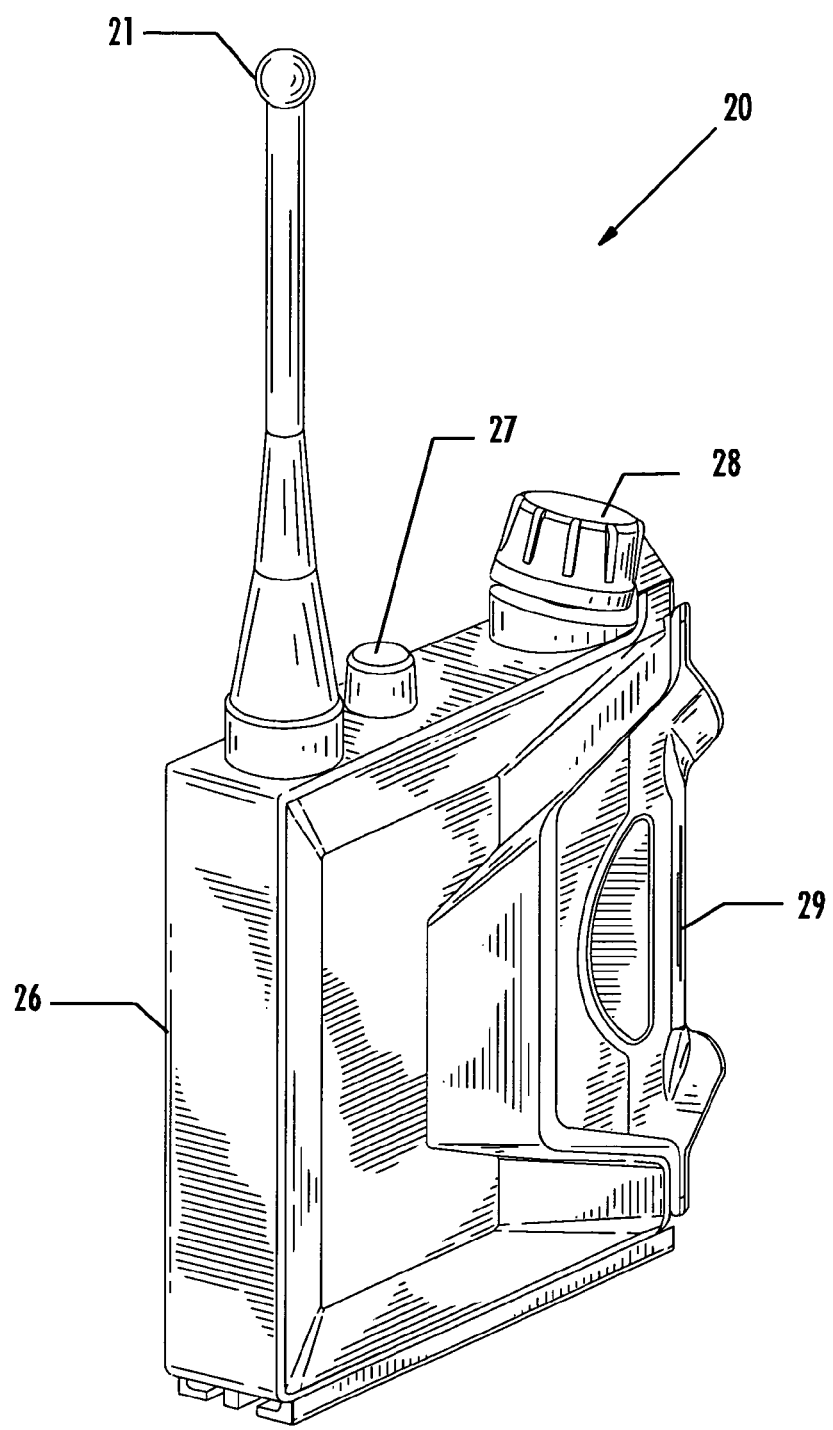
FIG. 1 is a perspective view of a wireless communications device in accordance with the present invention.
Figure 2:
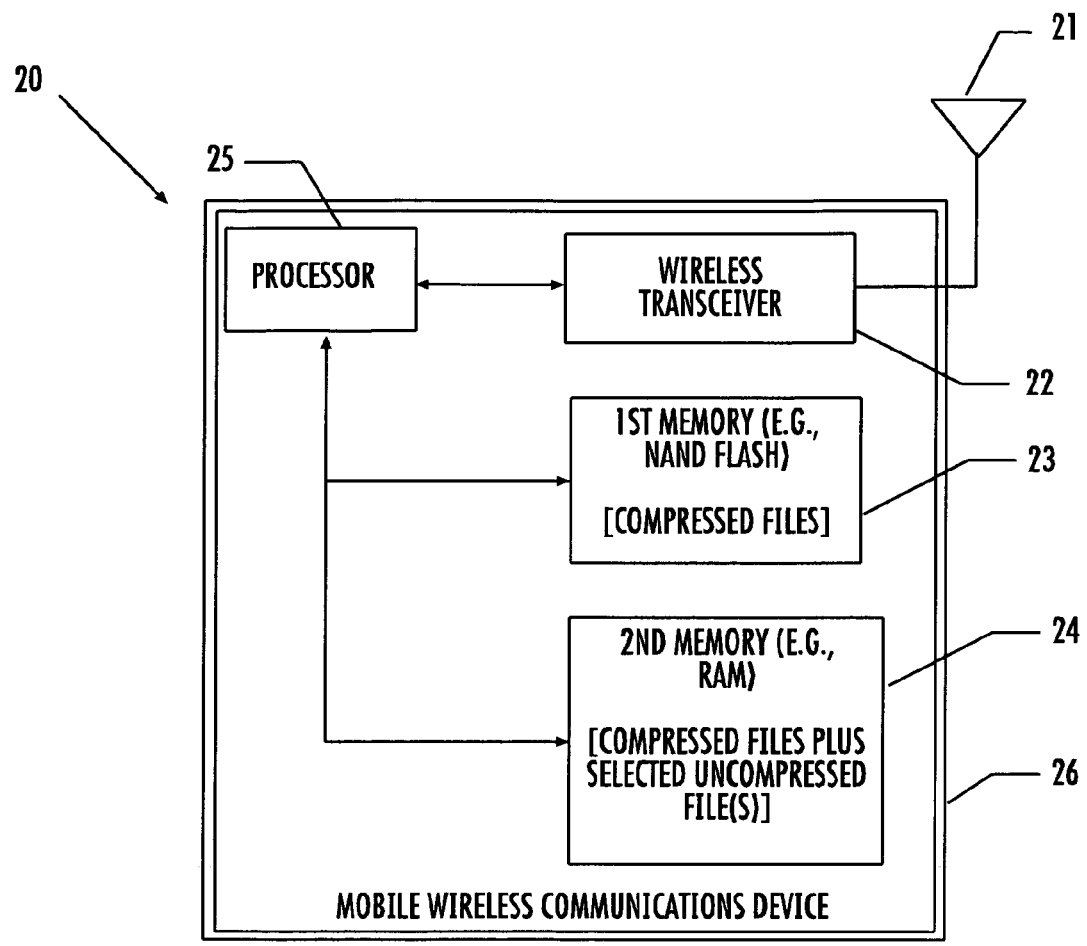
FIG. 2 is a schematic block diagram of the hardware components of the mobile wireless communications device of FIG. 1.

Referring initially to FIGS. 1 and 2, a mobile wireless communications device 20 in accordance with the present invention is first described. By way of example, the device 20 may be a software defined Joint Tactical Radio (JTR) set for use with the JTR System (JTRS) that operates in accordance with the Software Communications Architecture (SCA), as will be appreciated by those skilled in the art. The invention will be described hereinafter with respect to this exemplary implementation. However, it will also be appreciated from the following description by those skilled in the art that the device 20 may be used in other applications as well, such as cellular communications applications, for example.

The device 20 is preferably switchable between a plurality of wireless communications operating modes. In the case of a JTR, for example, such operating modes may include a Single-Channel Ground-Air Radio System (SINGARS) mode, a HAVE QUICK mode, and a VULOS mode. Of course, the device 20 may be used with numerous other operating modes as well, as will be appreciated by those skilled in the art.

The device 20 illustratively includes an antenna 21 and a wireless transceiver 22 connected to the antenna. Moreover, a first memory 23 is for storing a respective compressed file or software component for each of the plurality of wireless communications operating modes that the device 20 utilizes. More particularly, the compressed files may be compressed waveform files each for a respective one of the operating modes. Thus, for the exemplary operating modes noted above, respective SINGARS, HAVE QUICK, and VULOS waveform files would be stored in the first memory 23. Of course, in some embodiments more than one compressed waveform file may be associated with a given operating mode and stored in the first memory 23. In addition, multiple waveform component files may be compressed into a single compressed waveform file, as will be appreciated by those skilled in the art. The first memory 23 may be a non-volatile memory for long-term storage of the compressed files and other data. By way of example, the first memory 23 may be a NAND-type flash memory, although other suitable types of non-volatile memory may also be used.

The device also illustratively includes a second memory 24 having a faster access speed than the first memory 23, and a processor 25 connected to the first memory, the second memory, and the wireless transceiver 22. The second memory 24 may be a volatile memory, such as a synchronous DRAM (SDRAM), for example, and this is the primary memory from which the processor 25 processes data because of its relatively fast access speed. Yet, as noted above, because of its higher cost relative to flash memory, less RAM will typically be available on the device 20 than flash memory. The processor 25 may include a microprocessor and/or digital signal processor, for example. A portable housing 26 may carry the antenna 21, wireless transceiver 22, first and second memories 23, 24, processor 25, as well as control knobs 27, 28, and a plug-in module 29.

A JTR may be required to switch between different operating modes within a few seconds. As such, it would be desirable to have all of the waveform files uncompressed in the second memory 24 and ready for use by the processor 25 at all times to reduce switching times between one operating mode and the next. However, typical uncompressed software waveform components may be several megabytes, e.g., greater than about five megabytes. As such, when multiple waveforms are utilized in a single radio, the RAM capacity required to store all of the uncompressed waveform files may be prohibitive.

Figure 3:
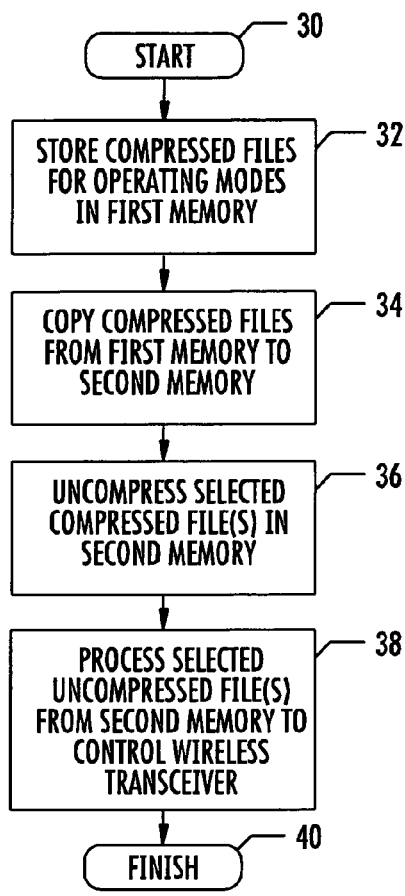
FIGS. 3 through 5 are flow diagrams illustrating method aspects of the present invention.
Figure 4:
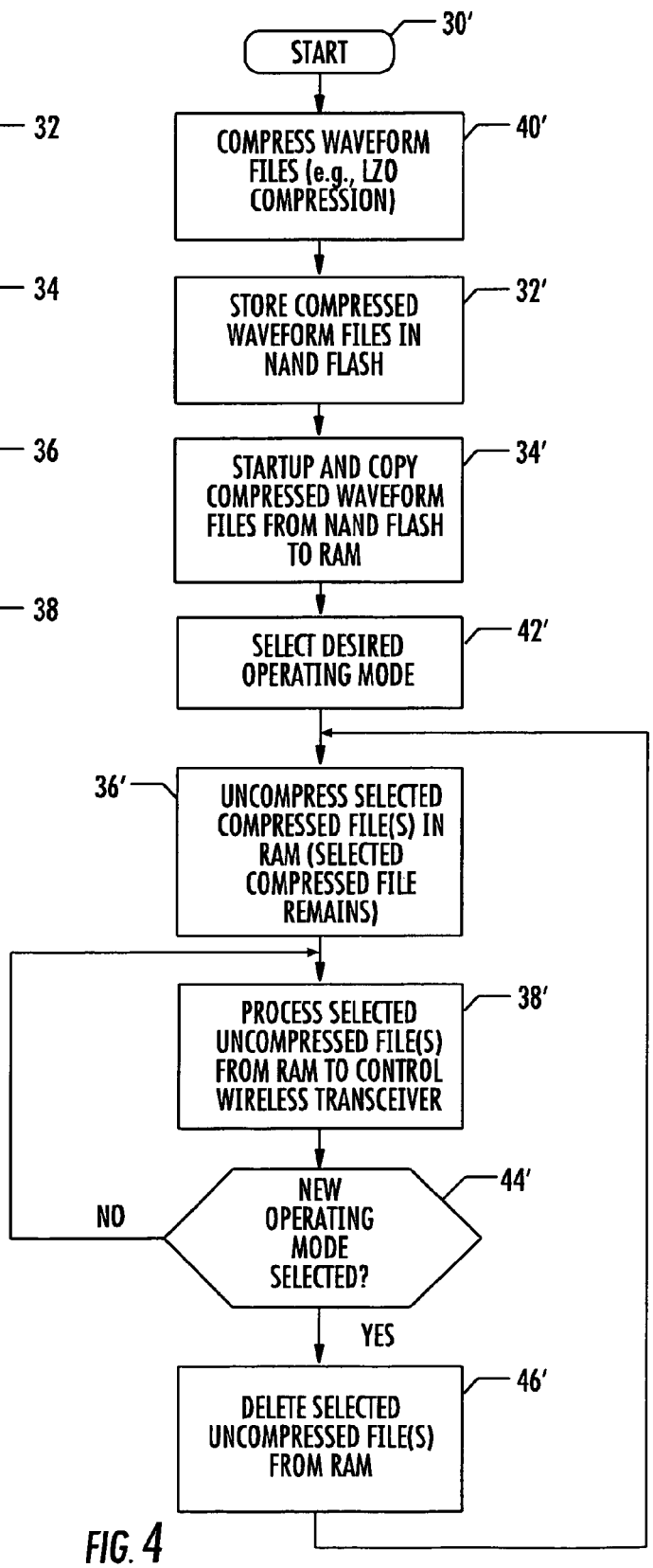

A particularly advantageous approach for decreasing switching times between operating modes while accounting for the limited RAM capacity of the device 20 will now be described with reference to FIGS. 3 and 4. Beginning at Block 30, the compressed files (e.g., waveform files) are stored in the first (NAND flash) memory 23, at Blocks 32, 32'. By way of example, the given waveform files to be utilized by the device 20 (as well as other software components) may be compressed on a host computer system (Block 40'). One exemplary data compression algorithm that may be used for compressing these files is a Lempel-Ziv-Oberhumer (LZO) algorithm, although other suitable compression algorithms known to those skilled in the art may also be used. The compressed waveform files are then uploaded to the first memory 23 of the device 20 during the manufacturing process via a universal serial bus (USB) or other communications port, or via a wireless connection, as will be appreciated by those skilled in the art. File updates may also be performed at a later time in a similar fashion.

The processor 25 causes the compressed waveform files to be copied from the first memory 23 to the second memory 24, at Block 34. By way of example, this may be done upon startup of the processor 25, i.e., when the device 20 is turned on by the user, at Block 34'. A desired operating mode may then be selected for the device 20, at Block 42'. The desired operating mode may be selected in various ways. For example, this may be done manually by the user through a variety of machine user interfaces (MUIs). Another approach for selecting the desired operating mode is for the processor 25 to cooperate with the wireless transceiver 22 and scan for communications signals from an available network or other devices to detect an appropriate or available operating mode, as will be appreciated by those skilled in the art.

Upon selection of the desired operating mode, the processor 25 uncompresses the compressed waveform file corresponding to the selected operating mode to generate and store a selected uncompressed file in the second memory 24, at Block 36, using an appropriate decompression algorithm (e.g., LZO decompression). Preferably, the original uncompressed waveform file for the desired operating mode will remain in the second memory 24 along with the uncompressed version of the file, at Block 36', although it would be possible to delete this or other compressed waveform files after the selected compressed file is uncompressed. The processor 25 then processes the selected uncompressed waveform file from the second memory 24 and controls the wireless transceiver 22 based thereon, as will be appreciated by those skilled in the art, at Block 38, thus concluding the method illustrated in FIG. 3 (Block 40).

By uncompressing and executing the selected compressed waveform file from the second memory 24 (i.e., RAM), the time required to implement the desired operating mode is significantly reduced. By way of example, in one test case a waveform file with an uncompressed file size of 2.87 megabytes was compressed using LZO compression to 1.09 megabytes (approximately a 38% compression). For the uncompressed file the measured spawn rate was 1.03 seconds per megabyte. However, by first copying the compressed version of the file into RAM and uncompressing and processing the file directly from RAM, the spawn rate was reduced to 0.10 seconds per megabyte.

Moreover, by retaining the compressed waveform files in the second memory 24 after startup, the processor 25 can switch between different waveforms relatively quickly. In particular, when a new or next operating mode is selected, at Block 44', the processor 25 may delete the selected uncompressed waveform file from the second memory 24, at Block 46', to free up space in the second memory 24. The compressed file for the next operating mode is then uncompressed in the second memory 24 and processed (Blocks 36', 38') as described above. It should be noted that, depending upon the given implementation and the size of the second memory 24, the uncompressed waveform file for the prior operating mode could be deleted after uncompressing the next waveform file, or simply overwritten, as will be appreciated by those skilled in the art.

Figure 5:
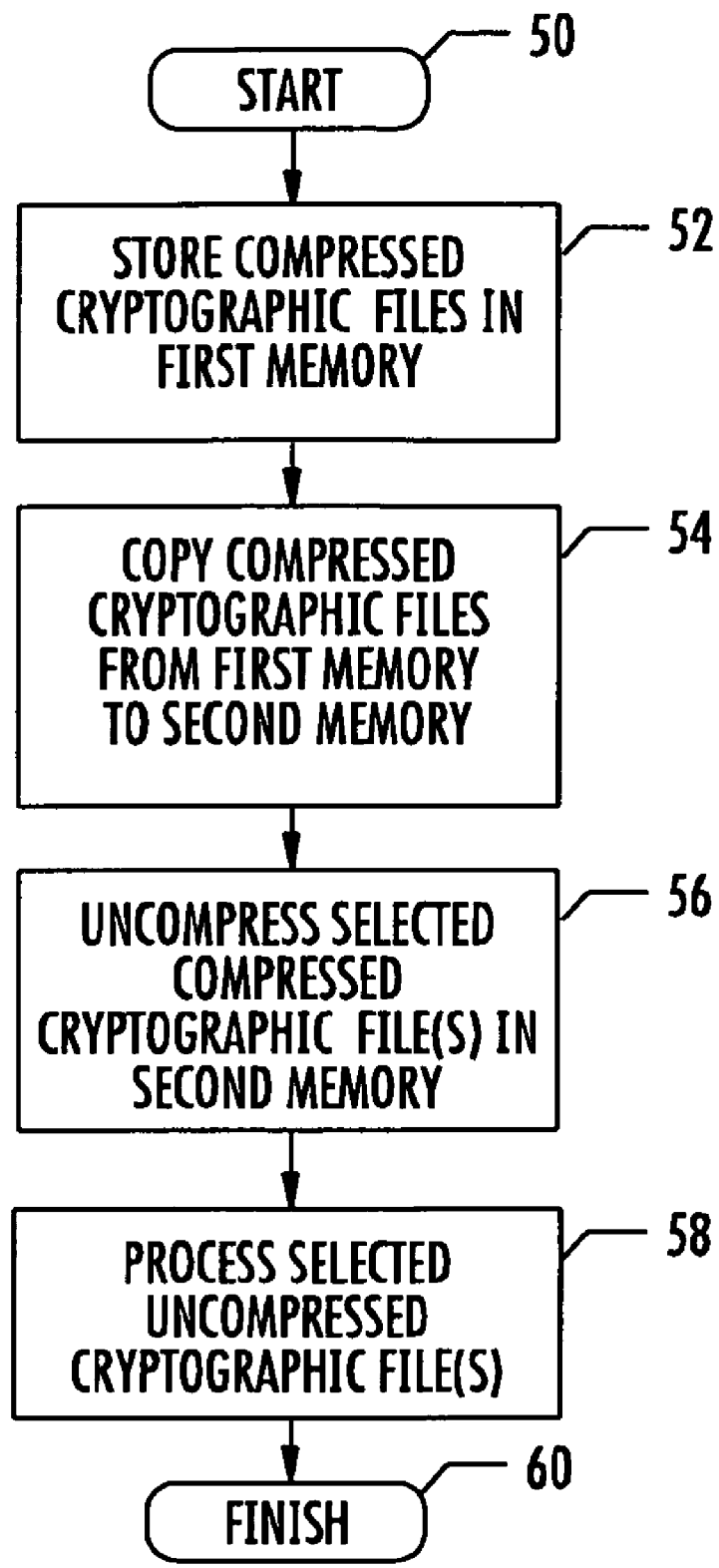

In accordance with another advantageous aspect of the invention now described with reference to FIG. 5, beginning at Block 50 the first memory 23 may also be for storing other compressed file types, such as cryptogrpahic files, for example, at Block 52. Simliar to the approach described above, the processor 25 may also copy the compressed cryptographic files from the first memory 23 to the second memory 24 (e.g., upon startup), at Block 54, uncompress a selected one (or more) of the compressed cryptographic files in the second memory, at Block 56, and process the selected uncompressed cryptographic file from the second memory, at Block 58, thus concluding the illustrated method (Block 60).

In some applications, a given compressed cryptographic file may be selected to be uncompressed based upon the desired or selected operating mode of the device 20. That is, different cryptographic operations may be required depending upon the given operating mode of the device 20. On the other hand, the cryptographic operations performed by some devices 20 may be common to different operating modes. In such applications, the processor 25 may simply uncompress one or more of the compressed cryptographic files as needed for particular operations, and delete the uncompressed cryptographic files after the operations are completed or as desired to manage memory allocation. It should be noted that in some embodiments it may be desirable to store compressed and/or uncompressed files in separate, secure (i.e., "red") memories, so that these files are not intermixed with unclassified (i.e., "black") files, as will be appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device switchable between a plurality of wireless communications operating modes and comprising:

an antenna;

a wireless transceiver connected to said antenna;

a first memory for storing a respective compressed file for each of the plurality of wireless communications operating modes;

a second memory having a faster access speed than said first memory; and a processor connected to said wireless transceiver, said first memory, and said second memory for copying the compressed files in a compressed form from said first memory to said second memory prior to performing mode switching, uncompressing a selected one of the compressed files to generate and store a selected uncompressed file in said second memory in less than an allowable mode switching duration, the selected compressed file remaining in said second memory after uncompressing by said processor, and processing the selected uncompressed file from said second memory and controlling said wireless transceiver based thereon.

2. The mobile wireless communications device of claim 1 wherein said processor operates in accordance with a Software Communications Architecture (SCA).

3. The mobile wireless communications device of claim 1 wherein said processor copies the plurality of compressed files from said first memory to said second memory upon startup.

4. The mobile wireless communications device of claim 1 wherein said processor further deletes the selected uncompressed file from said second memory based upon a selection of a next wireless communications operating mode, and uncompresses the compressed file for the next wireless communications operating mode.

5. The mobile wireless communications device of claim 1 wherein said second memory comprises a volatile memory.

6. The mobile wireless communications device of claim 1 wherein said second memory comprises a Synchronous Dynamic Random Access Memory (SDRAM).

7. The mobile wireless communications device of claim 1 wherein said first memory comprises a non-volatile memory.

8. The mobile wireless communications device of claim 1 wherein said first memory comprises a NAND flash memory.

9. The mobile wireless communications device of claim 1 wherein the compressed files comprise compressed waveform files.

10. The mobile wireless communications device of claim 1 wherein said first memory is also for storing a plurality of compressed cryptogrpahic files; and wherein said processor further:
- copies the compressed cryptographic files from said first memory to said second memory;
- uncompresses at least one of the compressed cryptographic files in said second memory; and
- processes the at least one uncompressed cryptographic file from said second memory.

11. The mobile wireless communications device of claim 1 wherein the compressed files are compressed with a Lempel-Ziv-Oberhumer (LZO) data compression algorithm.

12. The mobile wireless communications device of claim 1 further comprising a housing carrying said antenna, said wireless transceiver, said first memory, said second memory, and said processor.

13. A mobile wireless communications device switchable between a plurality of wireless communications operating modes and comprising:
- an antenna;
- a wireless transceiver connected to said antenna;
- a nonvolatile memory for storing a respective compressed file for each of the plurality of wireless communications operating modes;
- a volatile memory; and
- a processor connected to said wireless transceiver, said nonvolatile memory, and said volatile memory and operating in accordance with a Software Communications Architecture (SCA) for
  - copying the compressed files in a compressed form from said nonvolatile memory to said volatile memory prior to performing mode switching,
  - uncompressing a selected one of the compressed files to generate and store a selected uncompressed file in said volatile memory in less than an allowable mode switching duration, the selected compressed file remaining in said volatile memory after uncompressing, and
  - processing the selected uncompressed file from said volatile memory and controlling said wireless transceiver based thereon.

14. The mobile wireless communications device of claim 13 wherein said processor copies the plurality of compressed files from said nonvolatile memory to said volatile memory upon startup.

15. The mobile wireless communications device of claim 13 wherein said processor further deletes the selected uncompressed file from said volatile memory based upon a selection of a next wireless communications operating mode, and uncompresses the compressed file for the next wireless communications operating mode.

16. The mobile wireless communications device of claim 13 wherein the compressed files comprise compressed waveform files.

17. A method for wirelessly communicating based upon a plurality of wireless communications operating modes, the method comprising:
- storing a respective compressed file for each of the plurality of wireless communications operating modes in a first memory;
- copying the compressed files in a compressed form from the first memory to a second memory having a faster access speed than the first memory prior to switching between the plurality of wireless communications operating modes;
- uncompressing a selected one of the compressed files to generate and store a selected uncompressed file in the second memory in less than an allowable mode switching duration, the selected compressed file remaining in the second memory after uncompressing; and
- processing the selected uncompressed file from the second memory and controlling a wireless transceiver based thereon.

18. The method of claim 17 wherein processing comprises processing the selected uncompressed file in accordance with a Software Communications Architecture (SCA).

19. The method of claim 17 further comprising:
- selecting a next wireless communications operating mode;
- deleting the selected uncompressed file from the second memory; and
- uncompressing the compressed file for the next wireless communications operating mode.

20. The method of claim 17 wherein the first memory comprises a nonvolatile memory.

21. The method of claim 17 wherein the second memory comprises a volatile memory.

* * * * *